US005441414A

United States Patent [19]

Chretien

[11] Patent Number: 5,441,414

[45] Date of Patent: Aug. 15, 1995

[54] AUDIO-VISUAL DUMMY

[76] Inventor: Nicolas Chretien, 26, rue Auguste-Renoir, F-30400, Villeneuve-les-Avignon, France

[21] Appl. No.: 137,107

[22] PCT Filed: Apr. 13, 1992

[86] PCT No.: PCT/FR92/00326

§ 371 Date: Oct. 18, 1993

§ 102(e) Date: Oct. 18, 1993

[87] PCT Pub. No.: WO92/18970

PCT Pub. Date: Oct. 29, 1992

[30] Foreign Application Priority Data

Apr. 19, 1991 [FR] France ................................ 91 04837

[51] Int. Cl.6 ................................................ G09B 5/00

[52] U.S. Cl. ................................ 434/307 R; 434/365; 348/838; 348/522; 40/457; D14/124

[58] Field of Search ................. 434/86, 256, 762, 270, 434/307 R, 308, 365; 348/836, 151, 838, 522, 175, 173; 446/321, 337; 901/1, 47; 273/433, DIG. 28; 40/421, 414–420, 448, 456; D14/124; D21/59

[56] References Cited

U.S. PATENT DOCUMENTS

| | | | |
|---|---|---|---|
| 2,948,069 | 8/1960 | Johnson | 40/416 X |
| 3,973,840 | 8/1976 | Jacobs et al. . | |
| 4,046,262 | 9/1977 | Vykukal et al. | 901/1 X |
| 4,622,771 | 11/1986 | Spengler | 446/219 X |
| 4,641,251 | 2/1987 | Inoue | 901/1 X |
| 4,642,710 | 2/1987 | Murtha et al. | 40/448 X |
| 4,673,371 | 6/1987 | Furukawa | 446/175 |
| 4,835,450 | 5/1989 | Suzuki | 901/47 X |
| 4,923,428 | 5/1990 | Curran | 446/175 |
| 4,982,281 | 1/1991 | Gutierrez | 348/151 |
| 5,021,878 | 6/1991 | Lang | 901/1 X |

FOREIGN PATENT DOCUMENTS 2293023 6/1976 France .

OTHER PUBLICATIONS

"Computerized personal robots" by Daniel J. Ruby, Popular Science, May 1983, pp. 98–100 and 136.

"For the active couch potato" by William J. Hawkins, Popular Science, Jun. 1988, p. 19.

*Primary Examiner*—Joe H. Cheng

*Attorney, Agent, or Firm*—Harrison & Egbert

[57] ABSTRACT

An audio-visual dummy including a rigid anthropomorphic structure with, instead of a head, a monitor for delivering an audiovisual message. The monitor is connected to a message reader system. The rigid structures can be placed on a base. The base includes a storage space. The power cords to the monitor are positioned in the lower part of the monitor so as to be concealed from observers. The rigid structure is made of a plastic or resinous material.

11 Claims, 6 Drawing Sheets

AUDIO-VISUAL DUMMY

TECHNICAL FIELD

The invention relates to an audio-visual dummy.

BACKGROUND OF THE INVENTION

The prior art technique concerns so-called audio-visual dummies which are meant to be active: that means that they re-create the real presence of an individual. All the known techniques which aim at obtaining the illusion or the appearance of life in the dummy result from the projection of a film or of two or three-dimensional slides onto the head of the dummy, as in U.S. Pat. No. 3,973,840 and French Patent No. 2,293,023. The projection being synchronized with a sound recording, the dummy looks as if it had facial motions while giving a message. Known types of devices meet with many difficulties both in using and in providing a faithful reproduction of facial motions. The major difficulty in using such dummy results from the projection system which requires perfect lighting and adjustment, and therefore eliminates many possible uses as for example outdoor use. For someone using this type of dummy, it is very difficult, indeed impossible to create a visual and sound message on his own, since it requires a specific and time consuming preparation and production technique. Accordingly, the user is faced with a major inconvenience: the versatility of application of the dummy. The film or the slides made from a human face whose features have been used as a model for creating the facial features of the dummy, suppose the use of the head of the dummy which corresponds to that of the model. When facial movements will be projected onto the head of the dummy, there will always be either a slight time-lag or shadows because of projecting the face on a three-dimensional surface of about 180°.

It is an object of the present invention to find a remedy for the disadvantages above described.

SUMMARY OF THE INVENTION

According to the invention, the audio-visual dummy comprises a rigid structure which looks like a human body and, in place of the head, the rigid structures receives a monitor which is able to transmit an audio-visual message, such monitor being connected to a system for reading the message.

Interestingly, the audio-visual dummy is placed on a base wherein the reading system is inserted. Preferably, the various connections of the monitor are placed in its lower part so that the cords linking the connections to the reading system can be placed inside the rigid structure and be concealed from spectators.

Advantageously, the rigid structure comprises an inner metal core provided with hollow tubes able to house the cords.

Said rigid structure can also be made of plastic or resinous substances so as to avoid incorporating a metal core.

According to an interesting embodiment of the present invention, the monitor is provided with four anchoring points suitable to cooperate with four attachments which are part of the rigid structure.

Preferably, the base includes a space for storing video-cassettes and/or video disks as well as a space for a battery, an automatic cord winder and an infrared cell for the remote control of the system reading the audio-visual message.

So as to facilitate the movement of the dummy according to the invention, the base is advantageously mounted on rollers.

Preferably, the monitor is provided with a mask. When the film is read on the monitor, the face emerges from its support thanks to its natural colour so that the spectator can ignore the monitor. And the spectator will be able to ignore the monitor to a greater extent if the latter is oval-shaped. For the same purpose, the rigid structure which looks like a body can be provided with one or several articulated limb.

Once the message author's face has been previously recorded on a video-cassette or a video disk by means of a camera, the screen restores the same face and all the facial movements determined by this message. Such technique eliminates all the problems met by existing audio-visual dummies when restoring facial movements. Since the image is restored by the screen of the monitor, all the technical problems linked with the projection and therefore with lighting and adjusting conditions are eliminated. Thanks to its method, the audio-visual dummy enables the user to realize, very easily and all by himself, the message he wants to express as long as he has a camera which is compatible with the system of the video reader. Thanks to the technical characteristics of the monitor described hereinafter, the head of the actor can be watched by a spectator according to an angle of approximately 180°. Moreover, thanks to the technique of making a video film, the spectator being within such 180° area will find himself being watched straight in the eyes by the lively face on the screen. By means of the technical effect previously described, the present invention provides a continuous contact between the spectator and the audio-visual dummy.

The dummy is arranged so that it can be used in most places without having to be prepared. Actually it comprises the complete system which is necessary for it to work, unlike the audio-visual dummies of the prior art. Many other advantages appear to the user in comparison with existing communicating media: first, he can very easily personalize the audio-visual dummy to his image with clothing. Secondly, he can create his own message with an unlimited versatility of use, and choose the face and the voice which appear on the screen and thereby use it very freely. Thanks to its proper definition, the present invention combines all the advantages of a human message, such as the impact, and the visual effect which is perfectly realistic, and eliminates all the disadvantages such as presence, but also tiredness, demotivation, etc . . . . The system of this audio-visual dummy makes it possible to adapt it to any country, to any kind of situation and to make video messages in any existing language or dialect.

Other characteristics and advantages of the present invention will stand out from the following description of one embodiment of the dummy, such description being given as an example only and referring to the accompanying drawing.

DETAILED DESCRIPTION OF THE INVENTION

Figure 1:
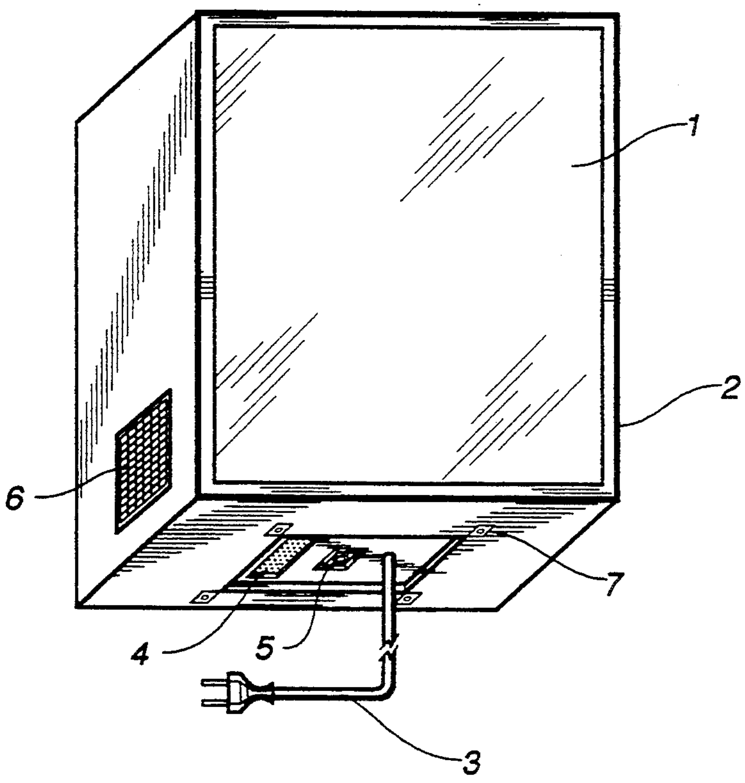
FIG. 1 shows the monitor.
Figure 2:
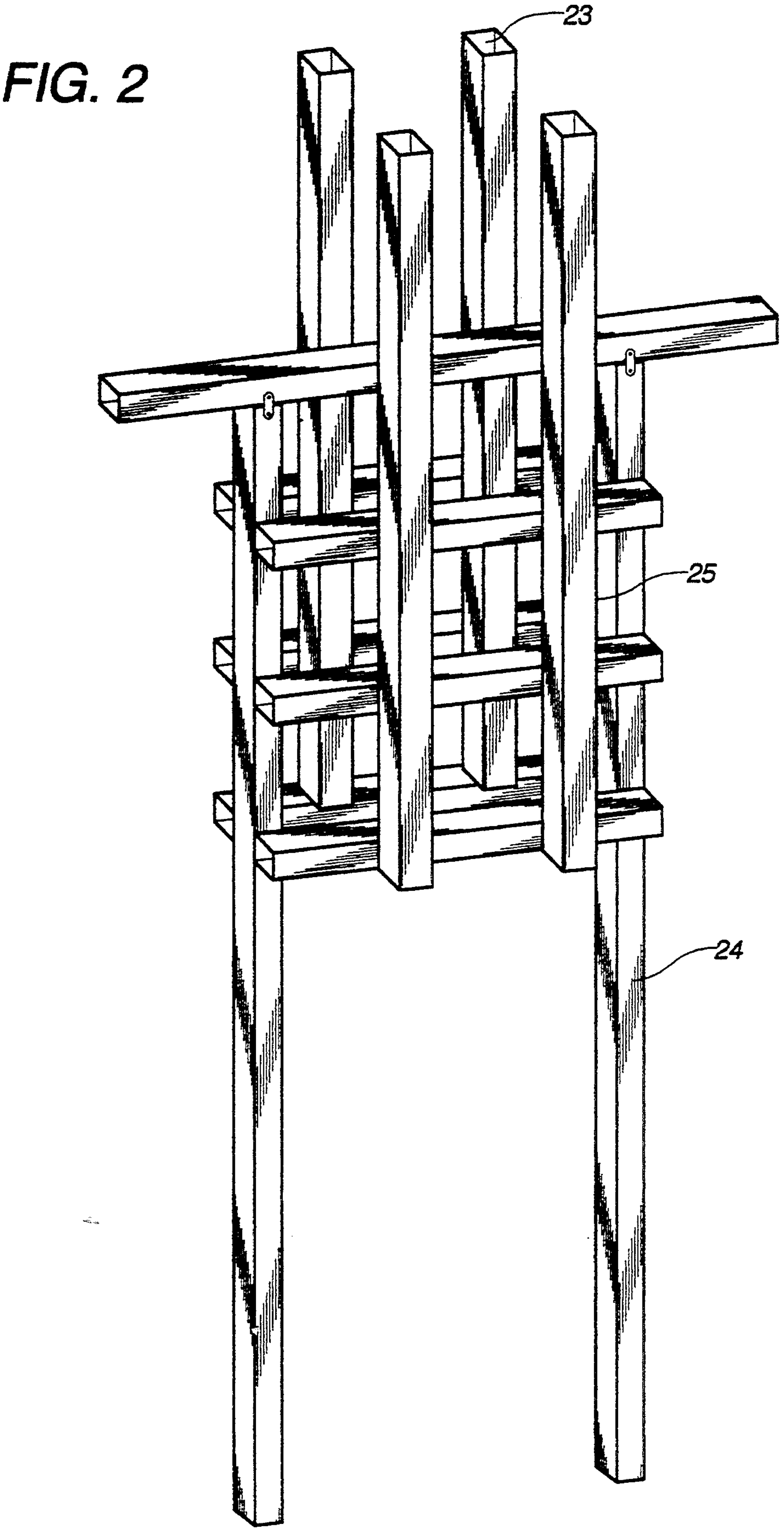
FIG. 2 shows the metal core of the rigid structure.
Figure 3:
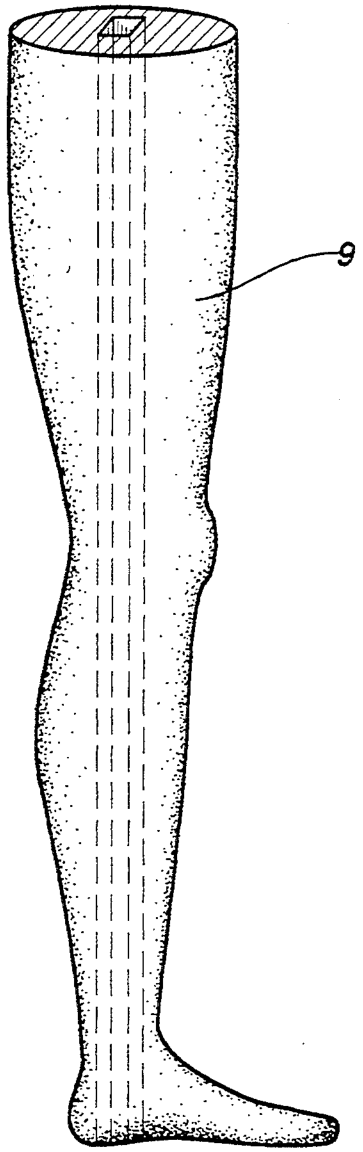
FIGS. 3, 4 and 5 represent the various parts of the body.
Figure 4:
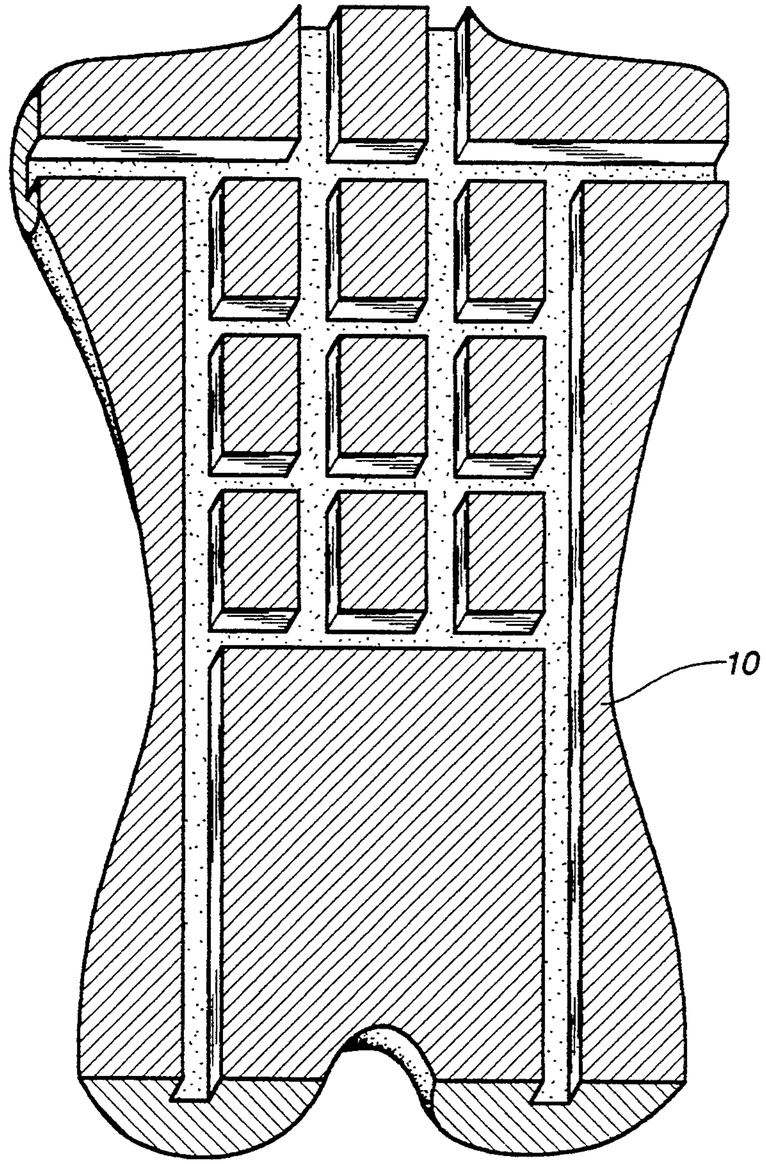
Figure 5:
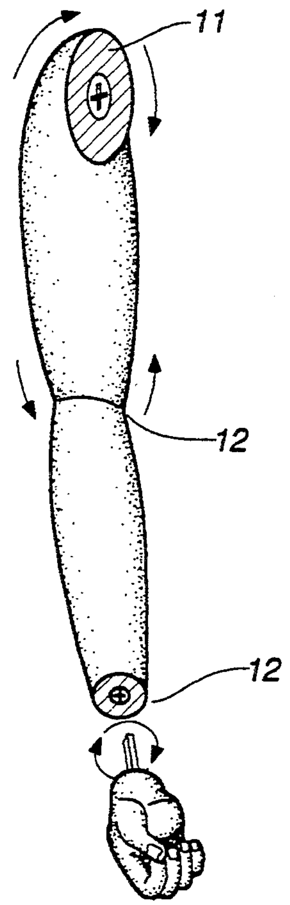
Figure 6:
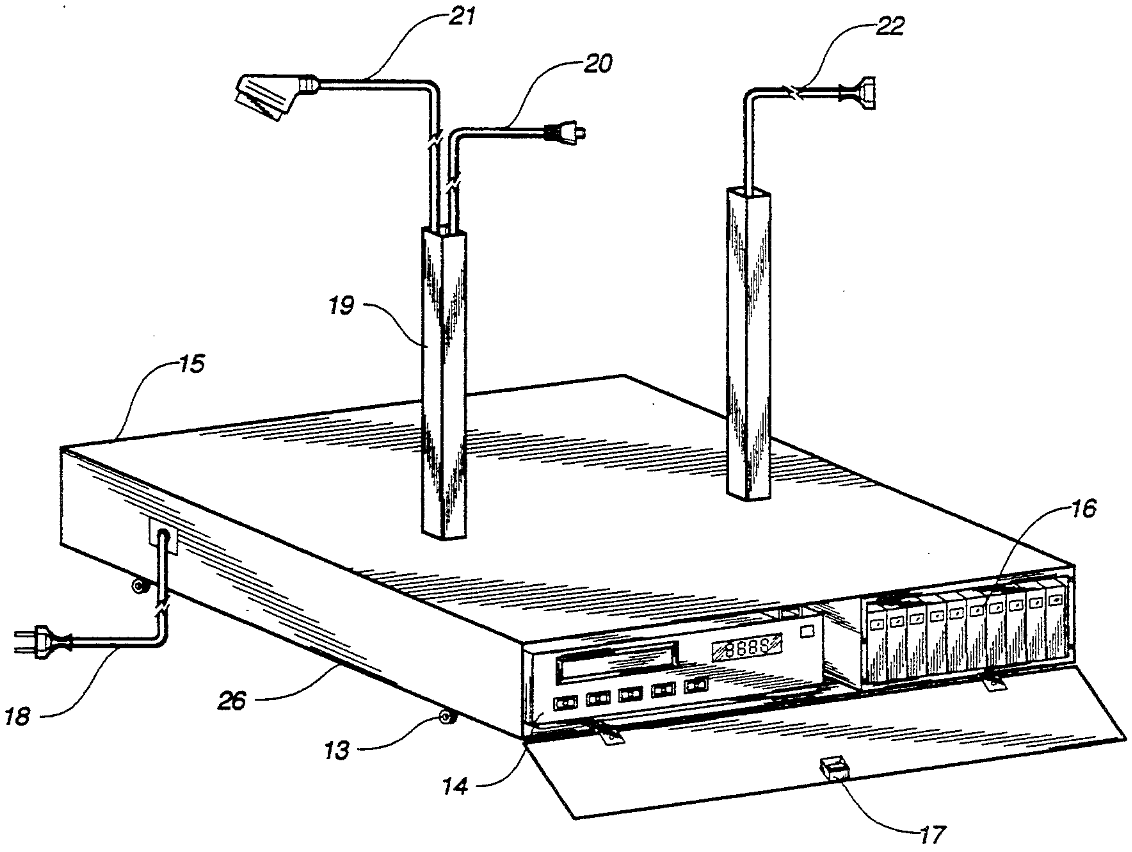
FIG. 6 shows the base with its incorporated device.

According to the various figures, the dummy comprises a colour rectangular monitor 1 having dimensions which are proportionate to those of a rigid structure which is bodylike and which composes the body of the dummy. The black mask 2 of the monitor is at the most two centimeters thick on its four sides, either on its upper, low, right and left part. Due to its specific use, the monitor 1 needs only one image reception channel together with basic functions such as light, contrast and colour control, loudness control, and other functions which are necessary to its adequate working. All the functions can be handled from a remote control system. The monitor is power supplied 3 through a power cord liable to receive various known electric standards, including 12 volts so that the audio-visual dummy is completely autonomous. A TV peripheral connector 4 is provided for the connection with the video reader 14 as well as an antenna entrance. The sound implement can intervene through the monitor, giving the sound reproduction through two loud-speakers 6 placed on both sides of the screen, and more precisely at mouth level. Such sound implement can also intervene through an amplifier and loud-speakers connected to the audio-video system. The power supply 3 of the TV peripheral connector 4 for the antenna entrance 5 is placed in the lower part of the monitor 1 in such a way that the connection between the monitor 1 and the rigid structure does not let cables nor cords appear to the spectators. The monitor 1 and the rigid structure are assembled by means of four anchoring points 7 fit to cooperate with four attachments 23 and belonging to the metal core 24 of the rigid structure.

The present dummy looking like a human body, is made from a metal core 24 which is rigid enough to hold the video screen weight.

The metal structure is made of square-shaped hollow tubes 25 fixed to the four attachments 23 and supporting the screen. The skeleton made of steel or aluminum is covered so as to give a body shape. The body is elaborated with moulds which can receive plastic injections or any other injectable substance and is broken down into three parts, either the legs, the trunk and the arms. The legs 9 are made so as to be inserted into the skeleton of the legs. The trunk 10 has been elaborated so as to fit perfectly into the metal skeleton while making four tubes emerge from the location of the neck, such tubes being used for fixing the body right in the centre of the screen without leaving any space. At the arms junctions 11, the trunk is equipped with an attachment for fixing the arms. The arms are made in such a way that it is possible to reconstitute any possible movements by means of an articulating system 12. The hands are also articulated, they can receive objects, such as a microphone or any other object which can be held by a human hand.

The base 26 which is rectangular-shaped as a box, is made of steel, aluminum or plastic; it supports the dummy in the required position providing it with a perfect stability. The base which is mounted on rollers 13 makes it possible to manipulate the dummy in every possible directions very easily. This moving system is manual, although an electric or other moving system can be contemplated, which provides the dummy with autonomous movements. In addition to the usual characteristics of this types of device, the reader 14 offers an "automatic reverse-repetition reading" function allowing the cassette to be reviewed several times without someone having to intervene. The video reader is power supplied through a power cord liable to receive the various known electric standards including 12 volts. An audio-video TV peripheral point and an RF output connector are provided so as to connect the monitor to the video reader. For a remote control of the dummy, an infrared detection cell 15 connected to the audio-video system is inserted into the front part of the base. In this box, a space has been provided for lodging the cassettes 16 and the video disks which are not used. For the dummy according to the present invention to be used in public, the box is equipped with a key locking 17, thereby preventing the device previously described from being deteriorated or stolen. Furthermore, an automatic power cord winder 18 is placed inside the base for the power supply of the dummy. On the top of said base 26, there are fixed two square-shaped hollow tubes 19 with a diameter smaller than those forming the metal skeleton hereabove described, which fix the dummy onto the base. The video reader is connected to the video screen by passing a coaxial cable 20 and/or a TV peripheral cable 21 through the metal tubes forming the skeleton of the dummy, as well as by the power cord of the video screen which is to be connected to the power supply device placed in the base 22. The various parts of the present invention are either imbedded or assembled by means of a fixing device so as make the metal core solid with the monitor which is in turn solid with the arms. The present audio-visual dummy is not limited to the form and the embodiment described herein, it can therefore receive the reproduction of a male, female, child of other body. According to another embodiment which is not shown here, a mechanical, electrical or electronic device can be used for creating a lengthwise and horizontal movement of the video screen, as well as an automatic motion of the arms, in order to increase the visual effect of the dummy.

The video message is made through a video camera compatible with the reading video system, VHS for example. The ZOOM lens of the camera is positioned right in front of the head of the actor at eyes height, and at a distance included between one and two meters. Thanks to this technique, the spectator who is within an area of about 180° in relation to the screen will find himself watched straight in the eyes by the lively face he sees on the screen. A black fixed plate having the same dimensions as the monitor is placed behind the actor's head for centering the camera on the one hand, and optimizing the visual effect of the face on the video screen thanks to its colour, on the other hand. At the bottom of this plate, there is placed another perpendicular plate which is shaped as a widened U wherein the actor positions and props his neck. The fact that his head is thereby positioned ensures that no movements be made at the basis of the neck, this feature being essential for a perfect centering between the actor's neck and the basis of the dummy's neck when the message is read on the video screen. The basis of the neck being held and the rear part of the head resting against the support, the actor's face can have slight lateral movements while the message is recorded, as long as the head does not project beyond its support. When recording it is necessary to use lighting so as to avoid backlighting and shadows on the face. It is advised to prepare the actor's face with make-up before recording so as to improve the appearance of the face. From then on, the actor is filmed while giving one or several messages which can be spontaneous or prepared in advance. In order to remember a prepared message, the actor or any other person, may have previously recorded his message on an audio cassette by means of a small earphone and repeat it, or he can repeat his message thanks to one of the various existing visual device such as an electronic panel which displays his message. Once the message has been video recorded, it is continuously reproduced up to the end of the video tape of the cassette which should be suited to the standards of the video reader. The cassette is then introduced into the audio-visual dummy reader described hereabove which thus restitute the video message required on the screen while giving an extremely realistic human appearance thanks to the method of making the message and the audio-visual dummy.

Thanks to its design, the audio-visual dummy according to the invention can be dressed with clothes made for a human being and accordingly any kind of clothes which can be found on the market is suitable.. Only socks and shoes should have a free space for allowing the tube which is used for fitting the base and the dummy to go through. It will be possible for the user of the present invention to choose the dress of the audio-visual dummy, and more particularly, for the first time he will be able to adapt the clothes to the actor's head on the monitor or vice versa. The user of such dummy, unlike known types of dummy, will be able to harmonize the face and the clothing. As an example, one can imagine, in order to promote or to inform on a stand selling fresh fish in a supermarket, an audio-visual dummy wearing a yellow oilskin, trousers and boots, holding a fishing .rod in one hand with the face of an old bearded fisherman on the monitor who would inform spectators about the freshness of the fish. Inversely, a dummy wearing an evening suit and holding a new perfume in one hand with the head of a pleasant and good looking person on the monitor, being good-looking who would vaunt the qualities and the effects of said perfume.

I claim:

1. An audio-visual dummy comprising a rigid structure in a form of a human body, said rigid structure receiving a video monitor in place of a head of said human body, said video monitor displaying an audio-visual message of an animated face, said monitor being connected to a system for reading said audio-visual message.

2. The audio-visual dummy according to claim 1, said rigid structure is placed on a base wherein said system is inserted.

3. The audio-visual dummy according to claim 2, said base comprises a space for storing video-cassettes, a space for a power cord and an infrared cell.

4. The dummy according to claim 2, the base is mounted on rollers.

5. The audio-visual dummy according to claim 2, said base comprises a space for storing video-disks.

6. The audio-visual dummy according to claim 1, connections of the monitor are placed in a lower part of the monitor so that cords linking the connections to the system are concealed from spectators.

7. The audio-visual dummy according to claim 6, said rigid structure comprises an inner metal core having hollow tubes able to house the cords.

8. The audio-visual dummy according to claim 1, said rigid structure is made of plastic material.

9. The audio-visual dummy according to claim 1, the monitor is equipped with four anchoring points cooperating with four attachments which are part of the rigid structure.

10. The audio-visual dummy according to claim 1, said rigid structure is equipped with at least one articulated limb.

11. The audio-visual dummy according to claim 1, said monitor comprises loud-speakers placed laterally in a lower part of said monitor.

* * * * *